United States Patent [19]

Meyer

[11] Patent Number: 4,613,304

[45] Date of Patent: Sep. 23, 1986

[54] GAS ELECTRICAL HYDROGEN GENERATOR

[76] Inventor: Stanley A. Meyer, 3792 Broadway, Grove City, Ohio 43123

[21] Appl. No.: 668,577

[22] Filed: Nov. 5, 1984

Related U.S. Application Data

[63] Continuation-in-part of Ser. No. 435,889, Oct. 21, 1982, abandoned.

[51] Int. Cl.[4] .................................. F23D 14/62
[52] U.S. Cl. ................................ 431/354; 204/129; 204/155
[58] Field of Search ............... 431/258, 2, 6, 12, 356, 431/354; 204/155, 129, 72, 243 M, DIG. 5, DIG. 6, 126, 129

[56] References Cited

U.S. PATENT DOCUMENTS

| | | | |
|---|---|---|---|
| 3,969,214 | 7/1976 | Harris | 204/129 X |
| 4,255,403 | 3/1981 | Mayer et al. | 204/155 X |
| 4,338,919 | 7/1982 | Hwang | 126/436 X |
| 4,369,102 | 1/1983 | Galluzzo et al. | 204/129 X |
| 4,421,474 | 12/1983 | Meyer | 431/354 X |
| 4,465,964 | 8/1984 | Cover | 204/129 X |

*Primary Examiner*—Larry Jones

[57] ABSTRACT

A hydrogen gas generator system for converting water into hydrogen and oxygen gasses, in combination with a magnetic particle accelerator for voltage/current electrical potential generation. The hydrogen gas generator encompasses an array of plates immersed in a housing and having natural water pass therethrough. Direct current, voltage dependant/current limited, potential applied to the plates causes the hydrogen/oxygen gasses to disassociate from the water molecule. The upper portion of the container is a hydrogen/oxygen mixture collection chamber for maintaining a predetermined gas pressure. There is introduced into the hydrogen/oxygen collection chamber, from a source, a substantial quantity of permanently magnetically polarized particles. Attached to the gas collection chamber outlet is a non-magnetic, non-conductive closed loop of tubing. The polarized magnetic particles are caused to circulate in the closed loop tubing by an electrical and/or mechanical pump. A pick-up coil wound around the tubing will have a voltage induced therein as the magnetic field of the polarized magnetized gas particles pass therethrough. The induced voltage has utilization as an electrical power source. In that the hydrogen/oxygen gasses are not polarized the gasses will seek a pressure release via an outlet. The hydrogen and oxygen gasses may be utilized such as in a burner system.

12 Claims, 2 Drawing Figures

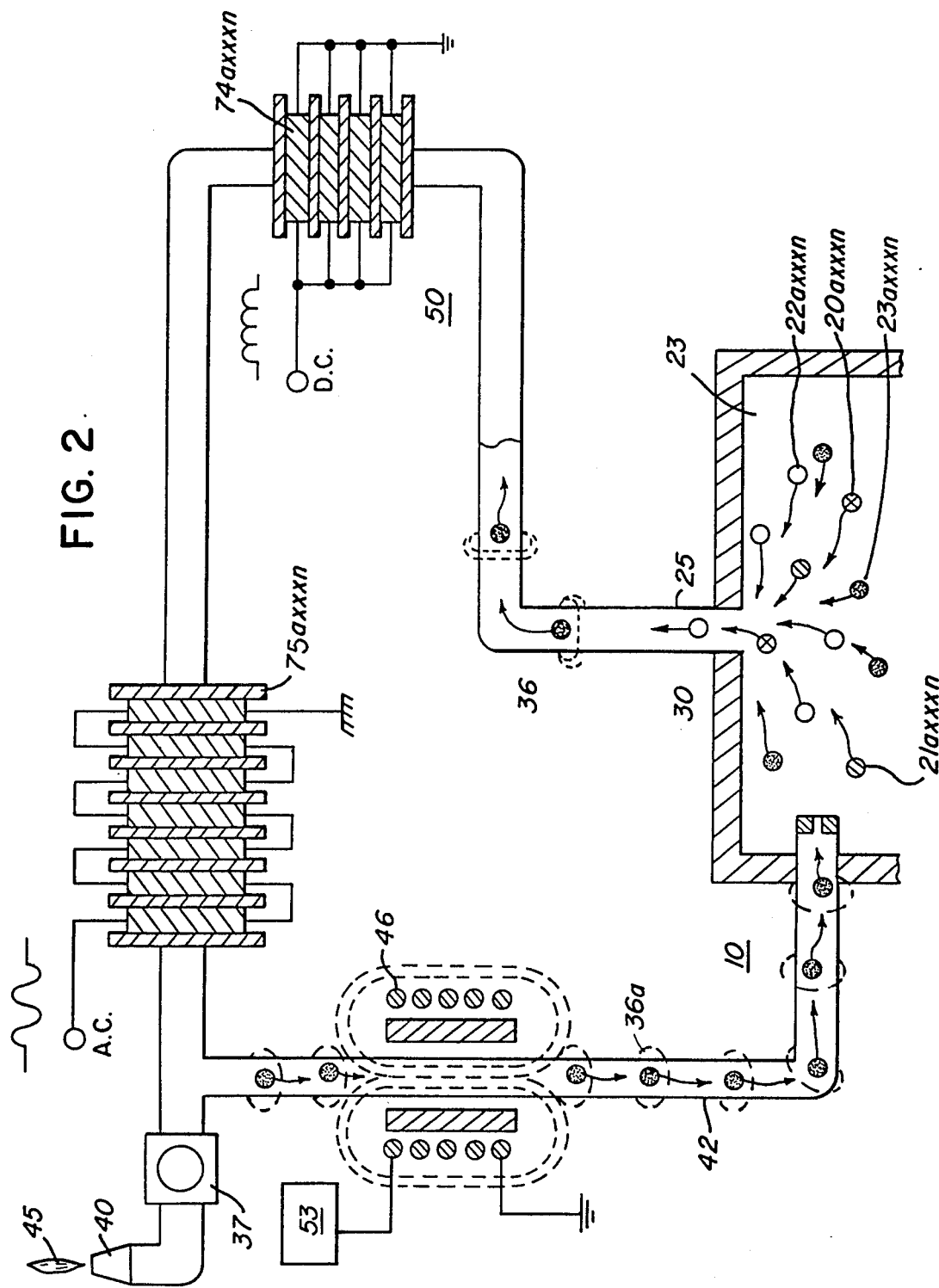

GAS ELECTRICAL HYDROGEN GENERATOR

This is a continuation-in-part application of Ser. No. 453,889, filed Oct. 21, 1982 now abandoned.

CROSS REFERENCE AND BACKGROUND

There is disclosed in my co-pending patent application, filed, Sept. 16, 1981, U.S. Ser. No. 302,807, for Hydrogen Generator, a hydrogen gas generating system. The apparatus comprises a pressure tight enclosure for a water bath having immersed therein an array of plates. The hydrogen and oxygen atoms are disassociated from the water molecule by the application of a non-regulated, non-filtered, d.c. voltage/current limited potential to the plates having natural water pass therebetween. The plates, as well as the housing, are non-oxidizing, non-corrosive, non-reactive, and of similar material. The upper portion of the container is a hydrogen/oxygen storage chamber for maintaining a predetermined level of pressure.

In my co-pending patent application, Ser. No. 411,977, for, Controlled Hydrogen Gas Flame, filed, Aug. 25, 1982, there is disclosed a hydrogen gas burner. The nozzle in the burner is connected to the storage area or gas collection chamber via an appropriate line. The port in the nozzle has an opening of a controlled size and configuration, related to the size of the flame and the temperature and velocity of the burning gas mixture.

Also, in my co-pending patent application, Ser. No. 367,051, for Electrical Particle Generator, filed Apr. 4, 1982, there is disclosed an electrical generating system that is utilized in combination with the aforesaid hydrogen/oxygen generator.

OBJECTS

It is a principal object of the present invention to provide a hydrogen gas electrical generator capable of producing a voltage/current much greater in magnitude hereintofore possible.

Another object of the present invention is to provide such a hydrogen gas electrical generator utilizing magnetized elements and wherein the magnetized particles are accelerated in a closed loop tubing to induce a voltage/current in a pick-up winding.

Another object of the present invention is to provide such an electrical generator in combination with a controlled output hydrogen generator.

Another object of the present invention is to provide such an electrical generator that utilizes readily available components that are adaptable to a simplified embodiment.

SUMMARY OF INVENTION

The present invention utilizes the basic principle of inducing a voltage current in a pick-up winding by passing a magnetic element therethrough in combination with a hydrogen gas generator. The particle accelerator utilizes the principles of my co-pending application Ser. No. 367,051, and the hydrogen generator is particularly that of my co-pending patent application, Ser. No. 302,807.

The hydrogen gas generator encompasses an array of plates immersed in housing having natural water pass therethrough. Direct current, voltage dependant/current limited, potential applied to the plates causes the hydrogen/oxygen gasses to disassociate from the water molecule. The upper portion of the container is a hydrogen/oxygen collection chamber for maintaining a predetermined gas pressure including an outlet means.

There is introduced into the hydrogen/oxygen collection chamber from a source a substantial quantity of permanently magnetically polarized particles. The particles dispersed in the collection chamber will superimpose themselves on the generated hydrogen/oxygen gasses. Attached to the gas collection chamber outlet is a non-magnetic/non-conductive closed loop of tubing. The polarized magnetic particles are caused to circulate in the closed loop tubing by an electrical and/or mechanical pump. Due to the alignment and the attraction of the particles, the particles movement through the loop is continuous. A pick-up coil wound around the tubing will have a voltage induced therein as the polarized magnetized gas particles pass therethrough. The induced voltage has utilization as an electrical power source. In that the hydrogen/oxygen gasses are not polarized the gasses will seek a pressure release via an outlet. The hydrogen and oxygen as may be utilized such as in a burner system.

Other objects and features of the present invention will become apparent from the following detailed description when taken in conjunction with the drawings in which:

BRIEF DESCRIPTION OF DRAWINGS

FIG. 2 is a magnetic particle tubing, in an electrical schematic circuit arrangement, illustrating the induced direct and alternating current voltage.

DETAILED DESCRIPTION OF DRAWINGS

Figure 1:
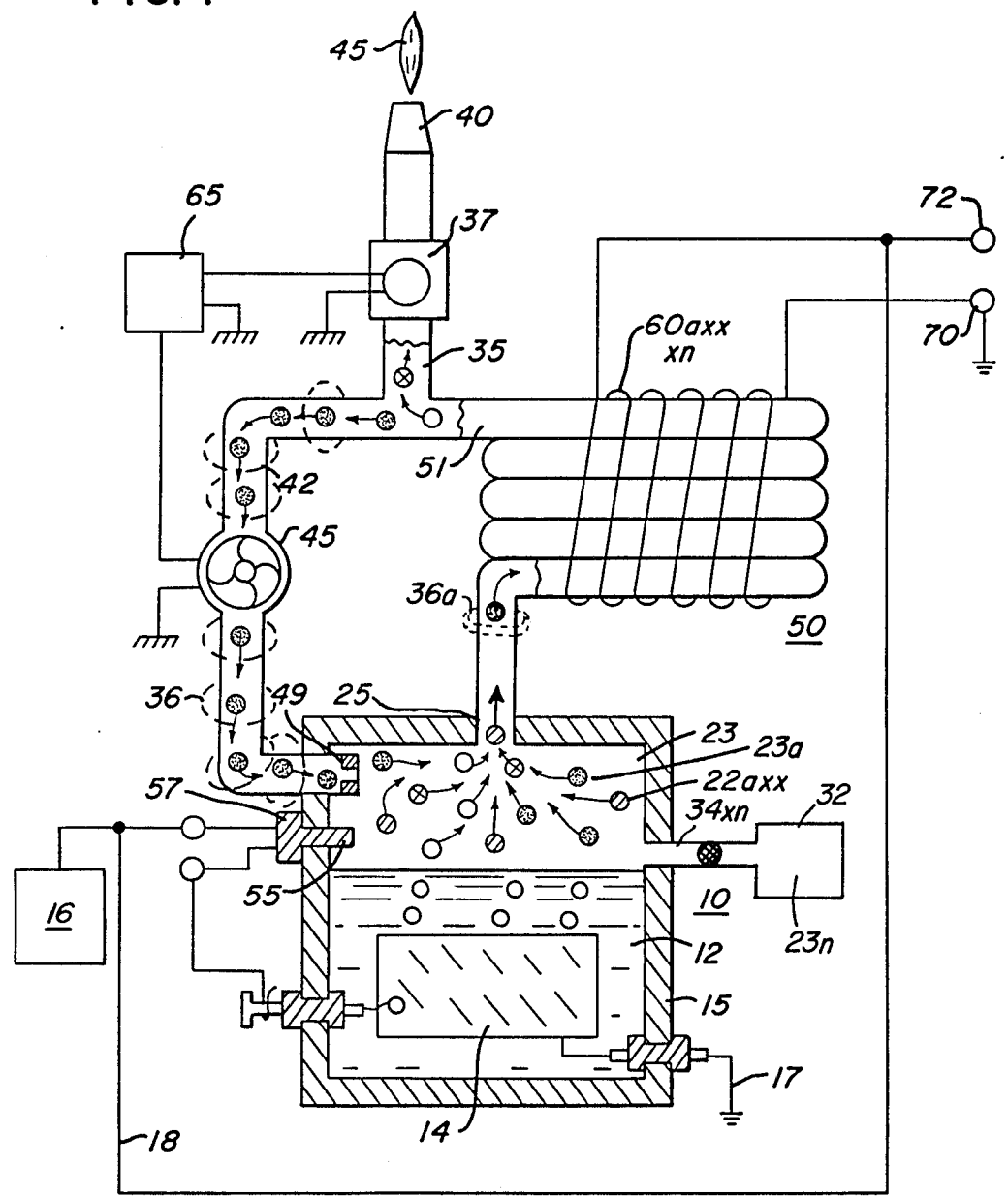
FIG. 1 is a simplified illustration of the principles of the invention, in cross-section showing the electrical particle voltage/current generator together with the hydrogen generator in a preferred embodiment.

Referring now to FIG. 1 there is illustrated the invention of the preferred embodiment in a simplified schematic arrangement. The generator 10 comprises an airtight pressure housing 15 of non-corrosive, non-oxydizing, non-reactive material. The housing 15 is filled with natural water of a predetermined level. Immersed in the water 12 is an array of plates 14.

In the preferred embodiment of the invention of FIG. 1, as disclosed in my co-pending application Ser. No. 302,807, the plates 14 are in pairs of similar non-corrosive, non-oxydizing, non-reactive material. A variable voltage source 16 having circuitry to restrict the amperage comprises additionally a pair of terminals connecting a positive and negative voltage to alternate plates 14 in the pair. The applied potential to the plates causes the hydrogen and oxygen atoms to disassociate themselves from the water molecule.

The released hydrogen gas depicted as particles 20a xxx 20n and oxygen gas particles 22a xxx 22n are collected and stored in the chamber 23 together with other released gasses such as nitrogen 21a xxx 21n.

The loop arrangement of tubing 50 has wound thereon a substantial number of turns 60a xxx 60n in a winding 60. The number and size of the turns is related to the tubing configuration and voltage/current output as setforth in my co-pending application. The magnetically charged particles traveling with a high accelerated velocity pass through the tubing 50. As the magnetically charged particles pass through the core of the winding 60, their magnetic field 36a traverses the windings 60a xxx 60n, and induces a voltage/current therein.

The output voltage/current is utilized via terminals 70–72.

As aforesaid, the storage chamber 23 is maintained at a predetermined pressure; and once the pressure is attained the hydrogen/oxygen gasses will be expelled into outlet line 25 with a substantial velocity. The pressure released gas mixture continues through the entire loop arrangement of tubing 50.

Upon demand for the flame, (such as for heat) from demand circuit 65, the valve 37 is opened causing the gas mixture circulating in closed loop 50 to be released to the nozzle 40 and provide the flame 45 upon ignition.

The hydrogen/oxygen gasses having the particles superimposed therein will separate and be pressure released via tubing 35 to the nozzle 40. In that the magnetic fields of the polarized particles provide an attractive force, the motion of the polarized particles through the closed loop 50 will be greater than the gas mixture pressure release. That is, with the valve 37 open the hydrogen/oxygen gasses will separate themselves from the polarized particles. The hydrogen/oxygen gasses will go via 35 to nozzle 40 whereas the polarized particles will continue to circulate through the closed loop. The chamber 23 further includes switch means 57 to shut off the electrical source 16 to the generator system when the pressure in the chamber 23 sensed by pressure gauge 55, achieves a predetermined level.

In the operation of the hydrogen generator as a burner, as disclosed in the co-pending patent application Ser. No. 411,797, the outlet tube 25 is connected directly to the nozzle 40 to obtain the flame 45 upon ignition. The operation of the gas burner is not altered in the present invention.

The housing 15 further comprises an inlet 34 having source 36 connected thereto. This permits the entry into the chamber 23 of a substantial amount of permanently polarized magnetized particles 36a xxx 36n.

The polarized particles 36a xxx 36n upon entry into the chamber 23 superimpose themselves on the hydrogen/oxygen gasses.

Upon demand, as set forth below, the opening of the valve 37 causes a pressure differential with the gasses collected in the chamber 23. In this way the gasses having the polarized particles superimposed thereon will be pressure released and caused to enter the closed loop 50.

Once in the closed loop the accelerator 45 will maintain the gasses and the superimposed polarized particles in a continuous circulating motion through the closed loop 50.

Connected to the outlet tubing 25 is a series of loops of non-magnetic tubing 50. The tubing in its loop configuration can be any one of the arrangements illustrated in my co-pending patent application, supra. The opposite end 51 of the loop 60 tubing is connected, via a Y connection, either to the burner assembly 40, via line 35, or a return line 42 to the storage 30. chamber 23.

It is to be appreciated that a miniscule amount of polarized particles will be carried into the outlet 35 as well as hydrogen/oxygen gas continuing to circulate through the closed loop. In the event the amount of polarized particles expended should become significant, the quantity of particles will be replenished from source 32.

Upon satisfaction of the demand, the valve 37 will close and thereby cause the gas mixture circulating through closed loop 50 to return to the collection chamber 23 via close loop line 42. In this arrangement the pump 45 will continue to be operative and cause a continuous circulation of the polarized particles through the closed loop. If the gas in the collection chamber is of the preset pressure, as sensed at gauge 55, the voltage via terminal 16 will be cutoff discontinuing the generation of gas.

With hydrogen/oxygen gas mixture demand circuit quiescent, the polarized particles will not be separated from the hydrogen/oxygen gasses at the outlet 35. The pump 45 is a continuous pump and thereby continuous to circulate through the closed loop 50 the polarized particles superimposed on the gas mixture from chamber 23.

The magnetized particle source 32 is operative to transform a material into minute vapor particles that are capable of being permanently polarized magnetically. The vapor, in the nature of a gas will superimpose on the hydrogen/oxygen gas.

With particular reference to FIG. 2 there is illustrated, partly in schematic and partly pictorial the preferred embodiment of the invention.

Initially is is noted that the pump 45 of FIG. 1 has been replaced by the electrical particle accelerator 46. The accelerator 46 is a non-mechanical/no moving part element and therefore not subject to wear. It is to be recalled, polarized particles have placed there on a magnetic field potential. Hence, as the magnetized particles approach the accelerator 46 they are attracted and as they pass the center of the accelerator and they are propelled therethrough.

Other propulsion means in lieu of the pump 45 of FIG. 1 or the accelerator 46 of FIG. 2 may be utilized.

As noted in the aforesaid co-pending patent application, the induced current/voltage can be, at the ouput 70–72, either direct current, or alternating current, or both. With reference to FIG. 2, the simplified schemetic illustrates a direct current voltage 4 parallel winding and an alternating current 75 in serial winding.

The number of coils 74a xxx n of direct current windings of coil 74 will determine the ripple frequency of the direct current voltage and its amplitude. Similarly, the number of alternating current windings 75a xxx n will determine the alternating frequency of the alternating current voltage and its amplitude.

More importantly, the aforesaid ripple frequency of the single polarity voltage of coil 74 and alternating frequency of the alternating voltage of coil 75 can be altered, varied, and controlled. That is, the frequency is a function of the number of discrete windings of the coils times the velocity of the gas per second. The velocity of the polarized particles in tubing 50, in turn, is varied by varying the magnitude of the input voltage to the accelerator 46. Simply an arithmetical increase in acceleration of the polarized particles results in a geometrical increase in frequency an amplitude of the ouput voltage from either the direct current winding 74 or the alternating current winding 75.

In the co-pending application, supra, for the Electrical Particle Generator, the accelerator input voltage source 53 is intended to comprise circuitry to provide alternate forms of electrical power, such as direct current, alternating current, direct current pulsing, and variable voltage. The output taken at the pick-up windings is related to the input voltage in shape, magnitude and in waveform.

With reference to FIG. 1 and with continued reference to FIG. 2, the hydrogen/oxygen generator 10, has applied to the plates 14 a direct current voltage. The voltage applied to the plates 14 from power supply 16, depending upon the utility of the generator, may be a variable voltage. For instance, if it is desired to vary the intensity of the flame 45, the voltage at the plates 14 will be varied.

Further, as specifically repeated, the voltage is current limited. Accordingly, the power source 16 will provide circuitry for varying the voltage to the plates 14 and for restricting the amperage to a neglible value relative to said voltage.

In a self-sustaining embodiment of the gas electrical generator, a portion of the output at the voltage taps 70-72 of the pick-up coils is directed back to the power supply 16. In that the total power requested to be applied to the plates 14 is relatively low, an insignificant portion of the ouput at taps 70-72 is required for sustained operation of the generator.

The electrical particle portion of the electrical gas generator of the present invention is operative continuously as set forth above. Hence the output voltage at taps 70-72 will be available to the power supply 16 whenever a demand for gas generation is made.

I claim:

1. In combination, a hydrogen/oxygen generator comprising:
    a hydrogen/oxygen generator including a housing having a gas collection chamber for maintaining a preset volume of gas therein under pressure,
    an outlet attached to said collection chamber,
    a non-magnetic tubing connected to said outlet,
    a gas line tubing connected to the other end of said non-magnetic tubing and said collection chamber in a closed loop,
    utilization means, and
    a Y type of connector alternately connecting said gas line tubing to said gas utilization means and said collection chamber;
    an inlet means attached to said gas collection chamber,
    a source of permanently magnetized polarized particles connected to said inlet and wherein said particles upon entering said inlet to said chamber become superimposed on said hydrogen/oxygen gases,
    means in said non-magnetic tubing for maintaining said polarized particles circulating through said closed loop,
    a pick-up coil positioned over said non-magnetic tubing and wherein the magnetic field of said magnetized particles passing through said tubing and traversing said pick-up coil induces a voltage/current therein,
    means for varying the acceleration of said polarized particles in said closed-loop tubing to vary the output magnitude of said induced voltage in said coils,
    means connected to said coil for utilization of said induced voltage/current potential; and
    wherein said hydrogen/oxygen gasses are pressure released to said utilization means, and the attractive force of said particles causes a continuous movement through said closed loop non-magnetic tubing.

2. The combination as set forth in claim 1 further comprising:
    two directional valve means, and
    a demand circuit connected to said valve means for selectively connecting said gas line tubing to said gas utilization means; and
    wherein said hydrogen/oxygen gasses have superimposed thereon said polarized particles;
    in a quiescent circuit demand said polarized particles continue in motion through said closed loop.

3. The combination as set forth in claim 1 further comprising:
    a nozzle connected to said gas utilization means of a predetermined size and configuration having a port for expelling said mixed gasses, and
    means for igniting said gasses.

4. The combination as set forth in claim 1 further comprising:
    a pressure gauge for determining the pressure in said collection chamber, and
    switch means connected to said direct current voltage source to terminate the generation of hydrogen/oxygen gasses upon said collection chamber attaining a predetermined pressure.

5. The combination as set forth in claim 1 wherein said polarized particles circulating means comprises an electrical/mechanical means, and wherein said means for varying the acceleration of said polarized particles comprises varying the speed of said electrical/mechanical means.

6. The combination as set forth in claim 1 wherein said polarized particle circulating means comprises mechanical means, and wherein said means for varying the acceleration of said polarized particles comprises varying the speed of the motive force of said mechanical means.

7. The combination of claim 1 wherein said polarized particle circulating means comprises electrical means, and wherein said means for varying the acceleration of said polarized particles comprises varying the electrical input to said electrical means.

8. The combination of claim 7 wherein said electrical means has an alternating voltage input and wherein said means for varying the accleration of said polarized particles comprises varying the frequency of said alternating input voltage.

9. The combination of a gas electrical generator as set forth in claim 1 wherein:
    said coil comprises a plurality of windings wound in parallel, and wherein said induced voltage/current therein is of a single polarity.

10. The combination of a gas electrical generator as set forth in claim 1 wherein:
    said coil comprises a plurality of windings wound in series, and wherein said induced voltage/current therein is of alternate polarity.

11. The combination of a gas electrical generator as set forth in claim 1 wherein:
    said coil comprises a plurality of windings and wherein the number of windings is determinative of the frequency of said induced voltage/current therein.

12. The combination of a gas electrical generator as set forth in claim 1 wherein said hydrogen/oxygen generator further comprises an array of plates positioned in said housing and means for passing natural water therebetween,
    a variable voltage source having circuit means for restricting current, and a positive and a negative terminal, means for connecting said positive terminal and said negative terminal to alternate plates, means for connecting the output of said pick-up coil to said voltage source.

* * * * *